Jan. 18, 1955 T. A. LAPENAS ET AL 2,699,633
PRECISION SUPPORTING OF ARTICLES
Filed Feb. 9, 1949 2 Sheets-Sheet 1

Inventors
Tauria A. Lapenas
and Olof Mohn
By Marechal & Biebel
Attorneys

Jan. 18, 1955 T. A. LAPENAS ET AL 2,699,633
PRECISION SUPPORTING OF ARTICLES
Filed Feb. 9, 1949 2 Sheets-Sheet 2

INVENTORS
Torpia A. Lapenas
and Olof Mohn
BY
Marechal & Biebel
ATTORNEYS

United States Patent Office 2,699,633
Patented Jan. 18, 1955

2,699,633

PRECISION SUPPORTING OF ARTICLES

Torpia A. Lapenas and Olof Mohn, Dayton, Ohio, assignors to Optron Laboratory, Dayton, Ohio, a partnership Application February 9, 1949, Serial No. 75,443

25 Claims. (Cl. 51—216)

This invention relates to the retention or holding and supporting of article for precision purposes.

It is the principal object of the invention to provide a simple and highly effective device for the holding and supporting of precision articles in definite and accurate position or guided in an accurately determined path or plane of movement, the device having a highly accurate surface such as to closely conform with the surface of the article itself, to thus guide and support the article in proper position leaving the article substantially free of deforming internal stresses.

It is also an object to provide a method of holding an article securely during the performing of a work operation or the like upon the article, the holding being accomplished without scratching or marring the surface of the article in any way, and under such conditions that the article when removed will retain the same highly accurate surface which was formed or which it had when in contact with the holding member or support.

It is a further object to provide such a holding device and method in which the force with which an article is so held may be controlled and predetermined as desired.

It is a further object to provide a means by which an article of any desired size or shape, such as a thin section of optical glass, for example, may be firmly held and supported with great accuracy upon a supporting surface which itself has been formed with accuracy and which represents a precision type support, the article being held with complete security and firmness for all normal operations of working, or for the actual use of the article, but leaving the article free of internal deforming stresses so that when removed it retains the same surface characteristics which it had when in position upon the supporting device.

It is a still further object to provide an accurately formed surface on which a work piece or other element may be received and yieldably held while being movable in an accurately defined plane or path of movement as defined by such formed surface.

It is also an object of the invention to provide a simple and effective method of producing an optical element having a predetermined spherically or aspherically curved surface by controlled distortion of a thin plate of transparent or light-reflecting material in accordance with the configuration of a master surface to be reproduced.

An additional object is to provide a holding device having a surface of predetermined spherical or aspherical curvature against which a glass or plastic plate can be pressed and which develops strong tractive forces under pressure capable of holding the plate in deformed shape corresponding to the curvature of the curved surface of the holding device.

Still another object of the invention is to provide an optical element which consists of a relatively thin plate of light transmitting material wherein the thickness of the plate varies over the area thereof in substantially direct relation with the corresponding deviation from optical flatness of a master surface to be reproduced.

Other objects and advantages of the invention will be apparent from the following description, the accompanying drawings and the appended claims.

In the drawings—

Figure 1:
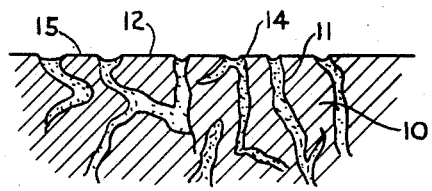
Fig. 1 is a diagrammatic view on a greatly enlarged scale showing a cross-section of a holding element in accordance with the present invention.

This application is a continuation in part of our application Serial No. 553,938, filed September 13, 1944, now abandoned.

In the forming of precision articles, such for example as optical elements, it is highly important to provide for the proper supporting and holding of the articles during the various stages of their processing and manufacture. Particularly when the articles are to have a high degree of accuracy, such for example as an accuracy measured by optical methods, where the article is to be used as a standard, or as a precision type article, the problem of properly supporting the article during the manufacturing operations becomes highly important. Thus for example an article which is held by plaster or by some other type of gripping action is subject to substantial internal stresses, which actually bend or deform the article. In such case it will be clear that the production on the article of a surface of great accuracy such as an optically flat surface, will be of no particular value when the article is subsequently removed from its support, and transferred to another operation or to its field of ultimate use, for with the gripping action being relieved, the internal stress within the article itself will result in deformations which will impair, if not entirely destroy, the accuracy which was developed in the surface while on its support.

Similarly in many cases it is desired to have a surface in the nature of a surface plate on which the article may be supported and on which it is firmly held, while at the same time being capable of being moved from one place to another on the supporting surface, or even entirely removed and then returned to its original position, with the assurance that it will at all times be supported accurately and in the predetermined desired position.

In order to serve as an example of the range of accuracy which is desired, it may be pointed out that the measurement of an optical flat through the use of the interference pattern of light rays provides for an accuracy of measurement in the order of a millionth of an inch, and if the article is not properly supported during its processing, it will be found upon removal of the article from its support that errors in the finished surface may greatly exceed this range, and thus render of no avail the accurate finishing of the article while on its support.

These conditions are particularly severe in the case where the articles are relatively thin in cross-section, the stress developed by the holding means heretofore used causing substantial internal unit stress. Such factors have heretofore placed serious limitations upon the ability to produce rapidly, cheaply, and in quantities, articles having the desired high degree of accuracy, and of cross-sections and shapes selected in accordance with the best and most desirable characteristics desired for the article itself, rather than in view of the necessities of the known methods by which the article could be produced.

In accordance with the present invention articles are held and supported upon the surface of a body which has been formed itself to a high degree of smoothness and accuracy, comparable with or even exceeding that of the surface of the article itself. The article is caused to be supported on the body through controlled surface traction which is uniformly distributed over the contacting areas, in such manner as to firmly and securely hold and support the article while leaving the body of the article substantially free of objectionable internal stress such as to result in deformation being present upon removal of the article from its support.

The article is held firmly and securely, and yet in such a way that its contacting surface is not scratched or marred at any time, thus making possible the holding of an optically accurate and highly polished surface in contact with the support and also providing for movement of such an article over the support without damage thereto while maintaining the accuracy of the plane of the support. For example the present invention provides a highly satisfactory and effective holding device for the support of an optical element in which it is desired to have the opposite surfaces optically flat, plane and parallel with each other within a high degree of accuracy, or within highly accurate dimensions or angular relationships. Since one accurately formed surface of the article is supported in close and predetermined accurate contact with a precision surface on the support itself, it is a relatively simple and highly practicable procedure to form the opposite surface optically accurate and parallel with the supporting surface to within an accuracy determined by optical methods, and within a matter of a few millionths of an inch for example.

Not only does the invention provide for supporting the article in the manner described above for the relatively short period of time required for the carrying out of a finishing or other work operation, but it also provides for the support of the article in its continued or permanent position of use where that is desired. That is, the holding device gives equally satisfactory results when the article is mounted in its permanent position thereon, maintaining the same desired high degree of accuracy in its position throughout an extended period of use thereof.

While the use of the invention for the purpose of supporting glass articles or other optical elements in place has been referred to, that has been mentioned for purposes of discussion and illustration, since the invention is not limited to the holding of articles of this particular type. The invention also provides for the supporting of articles of different characteristics such as articles of glass, metal, plastics, and articles of other suitable material which may be similarly held and supported with the desired high degree of accuracy. It is found further that where the body of supporting material and the supported article are such as to have different temperature coefficients of expansion, the holding of the article is accomplished in such a way that while firmly held, the article is substantially free to shift its position as required under the differential effects of expansion or contraction, the position of the article remaining accurate at all times, and the article itself remaining substantially free of objectionable internal deforming stress.

In the practicing of the invention, the holding device is composed of a body of granular or flaky structure which as formed in its final condition of use has a definitely porous structure, comprising an essentially solid mass with minute passages or pores extending throughout the same. Such body may be a naturally occurring one such as stone, or other like material having a porous structure, or it may be an artificially formed material such for example as a body of unglazed tile, porcelain material, or a porous vitreous material such as porous or powdered glass or quartz. If desired the body may be formed of a metallic material such as a body of finely divided ferrous or non-ferrous metal powder which has been shaped and then sintered to a prepared form, and in which the solid mass of the body is permeated by a series of pores or fine passages.

The selection of the material for the formation of the body will in some measure be dependent upon the character of the article which it is used to support, with reference to the relative hardness of the supporting material and that of the article itself. Where the articles being supported are optical articles of glass or the like, the use of material such as described above is not preferred in view of their being relatively harder than the glass, and thus capable of causing scratching of the finished and highly accurate surfaces desired on the glass. It is preferred in the practicing of the invention to utilize a material for the supporting body which is softer than the article to be supported, and also one which itself may be readily and easily formed to the desired shape and with the desired high degree of accuracy but where no objectionable scratching condition is encountered, a harder material may also be used.

A preferred material for the formation of the body of the support is a body of carbon, which is of porous but rigid nature, and which is formed of flakes or crystals assembled into a rigid mass, leaving a series of porous or fine passages extending throughout the mass. The use of carbon is also desirable since it may be formed readily and easily to provide the desired shape, and with the desired high degree of accuracy, which is maintained during its use, for example, a desired surface may be produced on a body of carbon by abrading the surface thereof with a master plate such as a glass or steel plate having its surface ground but not polished. Further the use of carbon is desirable since it is relatively stable and inert, and has a relatively low temperature coefficient of expansion, and is softer than glass so that it is incapable of marring or defacing the surface of the glass when used to support the same. The use of a carbon material is further desirable in the handling of optical pieces since the carbon surface is reflective, and thus makes possible the viewing and testing of the piece while held on the support through highly accurate optical methods. The fact that the reflective surface is likewise the supporting or contacting surface for the article makes possible the rapid and accurate testing of any surface of the article with respect to the supporting surface. For example, a plain parallel article may be tested for parallelism of both its upper and lower surfaces while being accurately supported on the carbon piece.

The porous body is first preferably formed to the shape desired, and one surface thereof is formed with the desired high degree of accuracy. For example, in a support to be used for receiving the flat surface of an article, the supporting surface of the body may be formed with the accuracy of an optical flat, thus forming an accurate surface against which the article can be received.

The article is held through the capillary forces of a wetting liquid within the pores of the supporting body, which liquid wets the same as well as wetting the adjacent surface of the article itself developing a definite tractive force thereon. Such wetting liquid may be incorporated in the body at any desired stage in its formation, or following its completed formation. Preferably it is incorporated in a quantity insufficient to completely fill or saturate the pores so that the liquid is normally retained primarily within the body of the article, but is exposed upon and may be withdrawn outwardly from the pores upon the surface of the body. Likewise the liquid may if desired be present upon the surface of the article and applied to the supporting body in that way. When the article is brought into surface contact with the supporting body by a direct movement toward that surface and with at most a slight wringing action, the application of a gentle pressure will immediately result in bringing the article into close surface contact with the body, leaving only an extremely fine space or passage therebetween, in the nature of an extremely fine capillary passage. This passage is penetrated and filled by the wetting liquid which also extends into the pores of the supporting body. Under the force of capillary action an unbalanced force is developed which is applied to the surface of the article in distributed relation thereover creating a tractive force thereon. The result of this is to draw the article firmly and uniformly into close adhering relation with the body, providing for the retention of the article thereon through all normal working operations on the exposed side of the article.

Since the force is one of surface adhesion as distinguished from a gripping or clamping action upon the sides or opposite face of the article, it is clear that the interior of the article is left almost entirely free of stress, and hence has no objectionable tendency to deform when in position or when subsequently removed. As a result, the formation of an optically accurate surface on the article while in contact with its support assures that the same highly accurate surface will be present upon the article following its removal.

In order to remove the article from its support it may be lifted directly therefrom, or if the tractive force is such as to make this difficult, it may be laterally moved sidewise toward the edge of the supporting body, the liquid film in that case being subjected to a shearing action which permits relatively greater freedom of movement.

Where work operations are to be performed upon the article while being so held it is desirable to provide a means for preventing undesired movement of the article with respect to its support. This may be accomplished through the use of a suitable coating material the application of which has the additional advantage that it protects the exposed surface of the supporting element.

A preferred material for this purpose is a wax such as paraffin, beeswax, or the like, which may be applied in a fluid state to thereafter set or harden with the formation of a stiff sealing sheet, establishing a film which will be maintained primarily on the surface of the support and without penetrating into or adhering thereto. When set, such coating material provides an additional holding action to prevent movement of the article relative to its support, thereby permitting the application of additional force as required in the handling or processing of the article. The use of the wax material is desired since it is essentially waterproof and hence in position forms a protective covering or coating over the exposed surface of the article to thereby protect the same and prevent access of moisture to the surface on which the article is supported. Following the completion of the processing or other work operation, the article may be readily removed in the same manner as described above, the wax coating material stripping off as a body or film and leaving the supporting surface free of any adhering particles or damaging material. Thereafter the support may again be used after only a simple cleaning operation, and without requiring further surface treatment.

The wetting liquid which is utilized may vary in accordance with the characteristics desired. The force with which the article is held in place varies with the surface tension and the capillary forces developed by the liquid. Thus where increased retention is desired, a liquid of greater surface tension may be provided, or a body in which the pores are smaller and more numerous may be used. Aqueous liquids are satisfactory, particularly in cases where the article is to be held for only relatively short periods of time during which loss of moisture by evaporation will not seriously affect the holding operation. Other organic and inorganic liquids of suitable chemical and physical properties may also be used to develop specific holding characteristics, the materials with high vapor pressure however ordinarily being less desirable because of the resulting loss of liquid. As a general rule oils as a group are satisfactory, a preferred material being an oil having low vapor pressure, and one which is relatively stable such that it is not easily oxidized or affected by long periods of use and in turn does not adversely affect the article itself. A particular material may be selected to have the desired viscosity and other characteristics at the temperature at which the device is to be used. As a specific example, very satisfactory results have been secured with the use of petroleum jelly as the wetting liquid which is applied to the finished surface of a block of carbon material.

The drawing in Fig. 1 shows a greatly magnified cross-section of the holding device in which the supporting body is made up of the solid portions 10, either in the shape of flakes or small granules, which are separated by the passages or pores 11. The working surface of the body is shown at 12 and is represented as being flat and highly accurate, with great uniformity, and with substantially all portions of the solid material occupying very closely the same position in the plane of the surface. Such working surface may have a high polish, such that it is capable of forming a specular image, thereby facilitating the testing and determination of the accuracy of formation of the surface. As illustrated, however, the surface is not continuous but is broken up by the openings of the pores 11 which extend down below the surface itself, forming openings through which the wetting liquid can pass.

The liquid is indicated at 14, and as shown it penetrates into the passages 11. Under the force of capillary attraction the liquid will penetrate into the maze of pores and gradually work its way into and substantially throughout the interior of the body. There is also a tendency to form an extremely thin surface film 15 over the finished surface of the body, such film being extremely thin and usually of the order of 3 ten-millionths of an inch.

Figure 2:
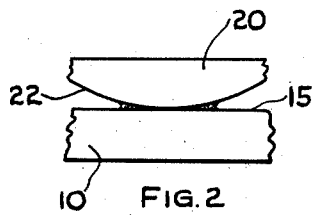
Fig. 2 is a similarly enlarged view illustrating the conditions which are present when an article is brought into supporting relation with a precision surface.

Fig. 2 shows the conditions which occur when the article 20 to be held is brought into surface contact with the body. The article is one which has a relatively accurately formed surface 22, such that it corresponds closely with that of the surface 15. Fig. 2 represents a greatly magnified cross-section, in which a portion of the article is represented as having a curved surface, relative to that of the supporting body, which for purposes of illustration may be considered as a curvature of approximately five millionths of an inch.

Figure 3:
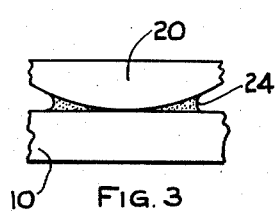
Fig. 3 is a similar view at an intermediate stage in the development of the forces of attraction which are utilized in the present invention.
Figure 4:
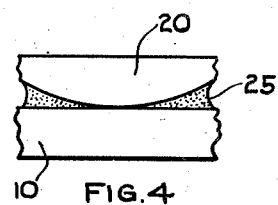
Fig. 4 is a similar view showing the final conditions under which the article is supported and held in proper position.

Under these conditions the convex portion of the article is brought into immediate and close contact with the body 10, so that an immediate adhering action is developed which provides for supporting and holding the article in position. In Fig. 3 the conditions are represented after a brief period of time, in which it will be seen that the liquid has worked its way along the convex surface to the position indicated at 24. Fig. 4 shows the condition after a further interval of time, the liquid having progressed to the outer edge of the body as indicated at 25. Under these conditions the minute spaces between the supporting body and the article resulting from extremely small surface irregularities thereof are caused to be filled automatically with the wetting liquid, resulting in the development of uniform and highly effective forces tending to hold the article in position by surface traction, while leaving the interior thereof substantially free of distorting forces. The liquid film thus developed adapts itself to any minor changes in curvature of the two surfaces, and further tends to act in a manner which may be compared to the action of a large number of springs secured respectively to the surface of the article and to the surface of the body, which hold the two elements firmly in contact, while at the same time permitting relative shifting movement therebetween in response to a differential expansion or contraction of one element with respect to the other. Differences of thermal expansion therefore have a minimum and non-objectionable effect on the accuracy of placement or on resulting distortion. The article is removed by lifting or by sliding the same laterally to one side of the supporting body, whereupon it may be withdrawn leaving the same substantially free of internal deforming stresses or the like.

Figure 5:
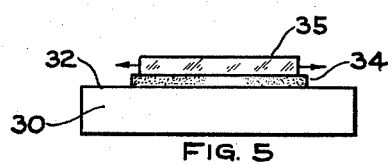
Fig. 5 is a view in side elevation showing the use of a more rigid support or backing member.

In Fig. 5 is shown a form of support which makes use of a relatively rigid backing or supporting member 30 which may be made of metal, glass, plastic or any material which will give the desired stability and rigidity. The support may be of any desired size or shape and may be ribbed or of any other desired structure to afford the proper strength. Support 30 has a surface 32 which on a glass block may be smooth and polished, but not necessarily an optically accurate surface. The supporting body of porous structure such as carbon is shown at 34 as being relatively thin in relation to member 30, the necessary stiffness being developed through its support on member 30. Body 34 may be formed with a highly accurate upper or similarly accurate upper and lower surfaces. Also it may contain a wetting liquid which develops the capillary forces of attraction as described above for retaining itself in position on support 30, and in turn for receiving and retaining the work piece 35. As indicated by the arrows, the work piece may be moved from place to place while still in contact with the supporting body, retaining its highly accurate position at all times in the plane of the upper surface of the supporting body.

The supporting body 10 may be formed in any desired shape, the surface 15 thereof for example being produced as an optically flat surface where used for the supporting of articles having a correspondingly flat surface, or it may be given a cylindrical, spherical, parabolic, or other regularly or irregularly formed curved surface, as may be desired for the receiving of the corresponding surface of the article. Further since the invention does not require the use of gripping or clamping members, it is highly economical of space and materials, since only the space is utilized which is actually required for the article itself. Articles which are circular in cross-section may be held and similarly articles which are square, rectangular or any other regular or irregular shape in section with equal ease and accuracy, thus making feasible the production of optically accurate elements which are other than circular in section. A more economical use of equipment results, and it is possible to mount and support a number of articles in any desired arrangement on one or more surfaces of a single supporting body. The invention is thus highly simple and effective in practice, and provides for new and desirable results in the precision supporting of articles.

Figure 6:
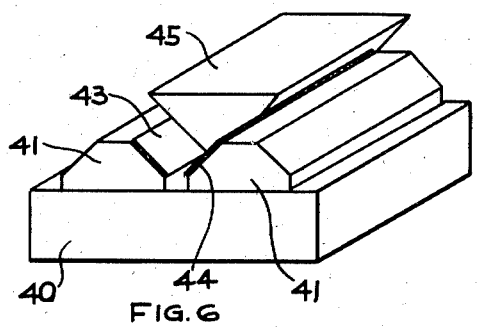
Fig. 6 is a partial perspective view showing an arrangement of supporting members particularly adapted for the accurate supporting of precision articles having angularly related faces.

Fig. 6 shows a typical example of a structure for supporting optically accurate angularly related surfaces. A main base 40 of glass or other suitable material carries a pair of parallel rail-like members 41 also suitably made of glass. On adjacent inclined surfaces of members 41 are mounted respectively a pair of relatively thin porous supporting bodies 43 and 44 the opposing surfaces of which are smooth, flat and at a precise angle with respect to each other. The element to be held is indicated at 45, being held at the desired angle in accordance with this invention with great accuracy, as desired for performing a work operation, for test purposes, or for permanent mounting.

Figure 7:
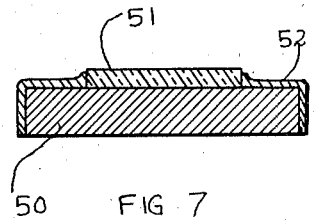
Fig. 7 is a cross-sectional view showing the use of a thermoplastic wax as an auxiliary retaining means.

A typical example of the use of a thermoplastic coating material to supplement the holding action of the porous body is shown in Fig. 7 in which the porous supporting body 50 receives the article or work piece 51 thereon in the manner already described. A coating of paraffin wax or other thermoplastic material 52 is applied around the outside edges of the elements, providing the additional holding action desired, such material being readily stripped off when the article is to be removed.

In addition to the use of the holding device as described for limiting undesirable distortion of precision articles while holding the articles in accurately predetermined position, these holding devices are adapted for use in the transfer of a spherically or aspherically curved surface from a master surface to an optical element to reproduce in the element the optical properties of the master surface by relatively simple production steps. For example, holding devices in accordance with the invention may be used in this manner for the production of optical elements such as correcting plates of the Schmidt type used to compensate for optical errors in lens and mirror systems. Furthermore, the invention provides for the production of such optical elements of non-uniform curvature without complex casting, molding or grinding operations and makes possible the production of such elements by relatively simple manufacturing steps and to a degree of optical accuracy which is closely comparable to the accuracy obtained by the most complex manufacturing procedures.

Figure 8:
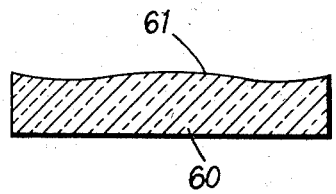
Fig. 8 is a somewhat diagrammatic sectional view showing a glass plate having a master surface of aspherical curvature to be reproduced.

Referring particularly to Figs. 8 to 15, there is illustrated in Fig. 8 a master plate 60 of glass having a master surface 61 of aspherical curvature to be reproduced. Since the invention makes possible the manufacture of multiple optical elements from a single original master plate, the surface 61 may be produced by grinding or other suitable laboratory methods to the desired initial accuracy.

Figure 9:
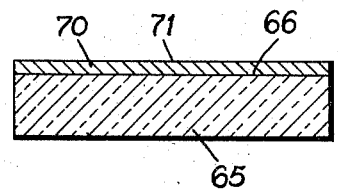
Fig. 9 is a view similar to Fig. 8 showing a glass plate having an optically flat surface on which is mounted a holding plate in accordance with the invention.
Figure 10:
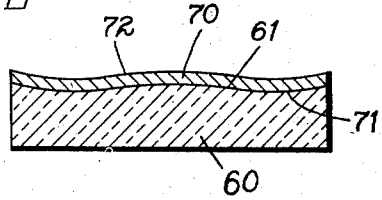
Fig. 10 shows the master plate of Fig. 8 with the holding plate of Fig. 9 transferred to the curved master surface thereof.
Figure 11:
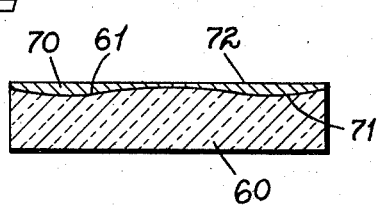
Fig. 11 is a view similar to Fig. 10 showing the holding plate with its outer surface ground flat.

Fig. 9 shows a second glass plate 65 having an optically flat surface 66 on which is mounted a plate 70 of carbon or other porous material of the type described in connection with Figs. 1 to 7. The plate 70 is ground or polished until its surfaces are both substantially optically flat and parallel to each other, the accuracy of these surfaces being readily tested by observing the fringe pattern therefrom in accordance with conventional optical practice. The plate 70 is then removed from plate 65 and transferred to the curved surface 61 of the master plate 60, and during this step the plate 70 is pressed and deformed against the surface 61 as shown in Fig. 10 until its surface 71 is held in substantially uniform contact with surface 61 by the capillary action of the liquid in the pores of plate 60 as described in connection with Figs. 1 to 7. The desired flexibility in plate 70 for this deformation can be obtained with a carbon plate 70 of a thickness up to approximately 1/8 inch where the variations or curves to be followed in the master surface are for example not greater than the thickness of the plate 70 over an area of about 6 inches in diameter. The use of carbon plates is preferred as the porous body not only because of the ease with which they may be surfaced, and that surface retained, but also because while remaining as a rigid body (as distinguished from one which flows or distorts under heat for example) it nevertheless is capable of being deformed to a sufficient extent by application of a moderate degree of pressure. In pieces of the dimensions mentioned above for example, manually applied pressure is usually found sufficient to press the porous plate into the desired close and self-adhering contact with the master plate.

Figure 12:
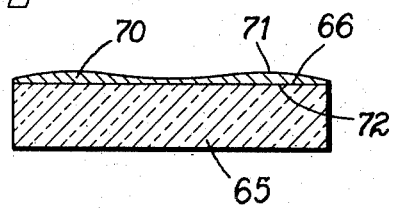
Fig. 12 is a similar view showing the holding plate transferred to the optically flat plate of Fig. 9.

After the carbon plate 70 has thus been caused to adhere to plate 60, its outer or exposed surface 72 is polished to match the flat surface 66 of plate 65, and plate 70 is then retransferred to plate 65 and its flat surface 72 is pressed into contact with the flat surface 66 of plate 65 until it is firmly held thereon. Fig. 12 shows the parts following this operation, and it will be noted that the exposed surface 71 of plate 70 is curved in the reverse direction from the master surface 61 and thus represents an exact negative of the master surface. The transfer step from plate 60 to plate 65 is readily accomplished by prying the edge of plate 70 away from the surface 61 and then lifting plate 70 completely away and mounting it on plate 65 with sufficient pressure to cause the desired adhesion to surface 66 resulting from the capillary forces of attraction of the liquid in plate 70.

Figure 13:
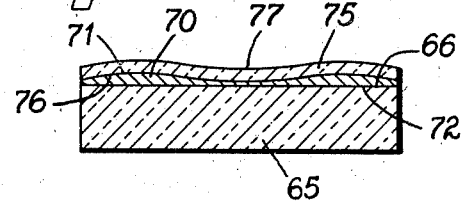
Fig. 13 shows a thin glass plate deformed into contact with the holding plate of Fig. 12.

A thin plate 75 of glass or other suitable optical material is mounted on plate 70 and pressed and deformed into contact with the curved surface 71 as shown in Fig. 13. The surface 76 of plate 75 should be relatively smooth but not necessarily optically accurate, since in this operation sufficient pressure is applied to cause the surface 76 to conform with and adhere to curved surface 71 over substantially its entire area. Adequate flexibility has been obtained for this deformation of a plate 75 of glass approximately 6 inches in diameter with this plate of a thickness within a range of approximately 1/32 to 1/8 inch, the showing of dimensions and curvatures in Figs. 8 to 15 being considerably exaggerated for purposes of illustration.

Figure 14:
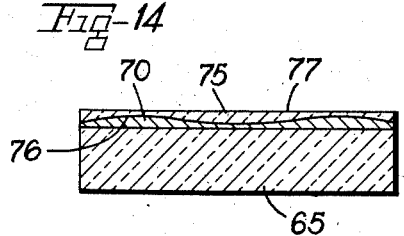
Figs. 14 and 15 illustrate subsequent steps in the treatment of the thin glass plate of Fig. 13.

The next step is illustrated by Fig. 14, which shows the exposed surface 77 of glass plate 75 as polished to substantial parallelism with the flat surface 66 of plate 65. As a result, it will be seen that at this stage of the method, the plates 70 and 75 are substantially complementary in shape, with each plate deviating from plane parallelism by equal and opposite amounts at any corresponding points therein. In addition, it will be seen that with the parts in the relative positions shown in Fig. 14, the surface 76 of plate 75 is a substantial duplicate of the master surface 61 of master plate 60.

Figure 15:
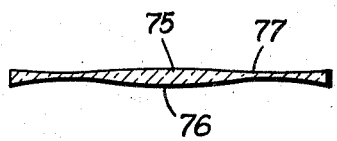

Finally the plate 75 is removed from the holder plate 70, and if it is found upon removal that plate 75 springs back at least partially from the deformed condition shown in Fig. 14, so that both its surfaces are curved as illustrated in Fig. 15, this change in shape has no objectionable optical effect when the plate 75 is to be used to transmit light, since although the deviations of each of its surfaces from optical flatness do not necessarily correspond to the similar deviations of master surface 61, its thickness varies over the area thereof in substantially direct relation with the curvature of the master surface 61. The plate 75 can accordingly be used as desired for transmitting light without further treatment. However, if plate 75 is to be used to reflect light from its surface 77, surface 76 may be accurately plane or flat before being pressed into contact with the holding surface 71, in which case surface 77 is ground and polished flat while plate 75 is mounted on the holder, and then after removal of plate 75 from the holder, surface 77 will be an exact replica of master surface 61 when surface 76 is flat; or if the mounting surface is not accurately flat, then after polishing surface 77, it may be remounted on a flat rigid support to retain the configuration produced by the grinding and polishing of that surface.

Figure 16:
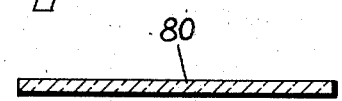
Figs. 16 and 17 show other optical elements produced by the method illustrated in Figs. 8 to 15.
Figure 17:

This method is also applicable to the production of plates of other optical properties than the aspherical plates described. For example, with the parts assembled as shown in Fig. 13, the exposed surface 77 of plate 75 may be ground to a spherical configuration within the limits of the thickness of the plate. This procedure may be followed, for example, to form thin lenses, in which case the holder plate 70 may be formed with its master surface 71 of a desired spherical configuration. Similarly the method may be employed to form plane-parallel plates or curved plates of uniform thickness. Thus to form a plane-parallel plate such as shown at 80 in Fig. 16, a thin sheet of optical material having one plane surface may be pressed directly into contact with the exposed flat surface 71 of holder plate 70 when the latter is mounted on flat plate 65 as shown in Fig. 9. The flat surface of the thin plate which engages the holder plate will thus be held with the desired optical flatness, and its exposed surface can then be polished while it is mounted on the holder plate until it is similarly flat and parallel to its inner surface. To form a plate of uniform or otherwise controlled thickness but not necessarily having flat or regularly curved surfaces, such as shown at 81 in Fig. 17, the same procedure is followed as in forming a plane-parallel plate but the surface placed in contact with the holder plate need be only a polished but not necessarily an optically accurate one. The exposed surface 77 is ground and polished to a uniform plane to match the surface of the holder plate and to produce a uniform thickness which is not affected by the change of surface form when removed from the holder.

This method has been practiced successfully as described to reproduce spherical or aspherical optical surfaces on thin optical elements with high accuracy substantially equal to that obtainable by the most precise methods of grinding and polishing spherical surfaces on thick optical parts such as ordinary camera lenses and prisms. In this connection, it will be noted that although the master surface 71 of the holder plate can if desired be developed by polishing, increased economy is achieved by employing a glass or metal master plate 61, since in this way multiple holder plates can be formed as described from a single master plate 60. Furthermore, a single holder plate may be employed to produce multiple optical elements as described, and if the master surface of the holder plate should become worn through use, it can be readily refinished for further successful use. It will also be apparent that in all the forms of the invention as described above, the body of porous material is employed for the purpose of holding an optical element or other precision article in desired position for a finishing treatment by the performance of a machining operation, such as grinding, polishing or the like, on an exposed surface of the article.

While the article and process herein described, and the forms of apparatus for carrying these processes into effect, constitute preferred embodiments of the invention, it is to be understood that the invention is not limited to these precise articles, processes and forms of apparatus, and that changes may be made in either without departing from the scope of the invention which is defined in the appended claims.

What is claimed is:

1. A device of the character described for holding articles comprising a substantially rigid body of porous structure having an accurate preformed surface thereon against which the article to be held is placed, said body having a quantity of substantially non-setting liquid of low vapor pressure in the pores thereof capable of wetting said pores of said body and the contacting surfaces of the article and said body developing a strong tractive force to retain the article in close surface to surface contact therewith by capillary attraction, and a surface coating on the exposed surface of said body surrounding the article, said coating being formed of a material adapted to harden upon application and maintained as a distinct separable film preventing undesired relative movement therebetween.

2. A device of the character described for holding articles comprising a substantially rigid body of porous structure having an accurately formed surface thereon against which the article to be held is placed, said body having a quantity of substantially non-setting liquid of low vapor pressure in the pores thereof capable of wetting said pores of said body and the surface of the article developing a strong tractive force to retain the article in close surface to surface contact therewith by capillary attraction, and a surface coating on the exposed surface of said body surrounding the article and formed of a wax material adapted to set in place to protect and retain said elements in predetermined relative position, said coating being maintained on the surface of said body in surrounding relation with the side edges of said article to hold the same against sliding movement on said body while being adapted to be readily stripped from said body.

3. In combination, a precision article and means for holding said article with a specific surface thereof exposed for performance of a machining operation thereon, comprising a body of carbon material of porous internal structure, one surface of said body being smooth and accurate within the limits of optical accuracy, said smooth surface being equal in area to at least a substantial portion of a second surface of said article, said article being mounted with said second surface thereof in contact with said smooth surface of said body, and said body having a quantity of substantially non-setting liquid of low vapor pressure in the pores thereof wetting said pores and the adjacent surfaces of said body and said article and developing strong tractive forces of capillary attraction while supporting the article in stationary position with respect to said body in maintained accuracy of position thereon with said specific surface of said article exposed.

4. A device for holding precision optical articles comprising a substantially rigid body of non-metallic porous granular material which is relatively stable and inert and the surface of which is softer than that of said optical article to be held thereon, one surface of said body being smooth and accurate within the limits of optical accuracy, the pores of said body containing a liquid wetting the pores thereof capable of developing capillary forces of attraction, said liquid also wetting the contacting surfaces of said body and said article upon the placing of an article in surface to surface contact therewith, said liquid being substantially non-setting and of low vapor pressure to remain in liquid form in use for retaining said article in accurately defined stationary position on the surface of said body through the tractive forces of capillary attraction, and means for forming a sealing coating on the junction between the sides of said body adjacent said smooth surface thereof and the article thus retained thereon to prevent access of foreign matter to said smooth surface of said body.

5. In combination, a glass optical element and means for holding said element with a specific surface thereof exposed for performance of a machining operation thereon while leaving said element substantially free of internal deforming stresses, comprising a body of carbon material having a porous internal structure with the pores extending to a surface thereof equal in area to at least a substantial portion of a second surface of said element, said element being mounted with said second surface thereof in contact with said surface of said body, said body surface being formed as a smooth and highly accurate surface within the limits of optical accuracy, a wetting liquid within the pores of said body and accessible upon said formed surface, said liquid being substantially non-setting and of low vapor pressure to remain in liquid form in use for being drawn outwardly from said pores in response to the placing of said element in said surface to surface contact therewith, and said liquid filling the minute spaces between said surfaces formed by surface irregularities and holding said element firmly in stationary position under the tractive forces of capillary attraction with said specific surface exposed.

6. In combination, a glass optical element and means for holding said element with a specific surface thereof exposed for performance of a machining operation thereon while leaving said element substantially free of internal deforming stresses, comprising a body of carbon material having a porous internal structure with the pores extending to a surface thereof equal in area to at least a substantial portion of a second surface of said element, said element being mounted with said second surface thereof in contact with said surface of said body, said body surface being formed as a smooth and highly accurate surface within the limits of optical accuracy, a wetting liquid composed of an oily and substantially non-setting material of low vapor pressure within the pores of said body and accessible upon said formed surface, and said liquid also wetting the adjacent contacting surfaces of said element and said body in response to the placing of said element in said surface to surface contact therewith and entering the minute spaces between said surfaces to hold said element firmly in stationary position upon said accurate body surface under the forces of capillary attraction with said specific surface exposed.

7. In combination, a glass optical element and means for holding said element with a specific surface thereof exposed for performance of a machining operation thereon while leaving said element substantially free of internal deforming stresses comprising a body of carbon material having a porous internal structure with the pores extending to a surface thereof equal in area to at least a substantial portion of a second surface of said element, said element being mounted with said second surface thereof in contact with said surface of said body, said body surface being formed as a smooth and highly accurate surface within the limits of optical accuracy, a wetting liquid composed of petroleum jelly capable of wetting the pores of said body and accessible upon said formed surface, and said liquid also wetting the adjacent surfaces of said element and said body in response to the placing of said element in said surface to surface contact therewith and entering the minute spaces between said surfaces formed by surface irregularities to hold said element firmly in stationary position under the forces of capillary attraction with said specific surface exposed.

8. In combination, a precision article and means for holding said article with a specific surface thereof exposed for performance of a machining operation thereon while leaving said article substantially free of internal deforming stress, comprising a preformed porous body of relatively inert material and substantially rigid in nature formed and shaped to provide a highly accurate contacting surface accurate within limits of optical accuracy and equal in area to at least a substantial portion of a second surface of said article, said article being mounted with said second surface thereof in contact with said smooth surface of said body, and a quantity of substantially non-setting wetting liquid of low vapor pressure partially filling the pores of said body and accessible upon said formed surface of the body as a liquid, said liquid in response to the placing of said article in close surface to surface contact with said body being drawn outwardly from said pores under the forces of capillary attraction, and said liquid being present in a total quantity insufficient to saturate said pores and thereby developing a strong tractive force to hold said article firmly in predetermined stationary position by surface traction distributed over the contacting area thereof with said specific surface exposed.

9. In combination, a precision article and means for holding said article with a specific surface thereof exposed for performance of a machining operation thereon while leaving the article substantially free of internal deforming stress, comprising a substantially rigid porous body of relatively inert material capable of being formed and shaped to provide a contacting surface accurate within limits of optical accuracy and equal in area to at least a substantial portion of a second surface of said article, said article being mounted with said second surface thereof in contact with said smooth surface of said body, and a quantity of wetting liquid partially filling the pores of said body and accessible upon said formed surface of the body during use as a liquid, said liquid in response to the placing of said article in surface to surface contact with said body being drawn outwardly from said pores under the forces of capillary attraction providing and developing a strong tractive force to hold said article firmly in predetermined position by surface adhesion distributed over the contacting area thereof, said liquid being substantially non-setting and of low vapor pressure to provide for relative differential movement of said article and said body in response to temperature changes while retaining the article in firmly adhering stationary relation to said body with said specific surface exposed, and means forming a seal between said second surface of said article and the sides of said body adjacent said formed surface thereof to prevent access of foreign matter to said formed surface.

10. The method of machining a specific surface of an optical element which comprises forming a body of granular porous material, shaping a surface of said body to provide a surface thereon of a high degree of smoothness and accurate to within optical limits of accuracy, applying a quantity of substantially non-setting wetting liquid of low vapor pressure to the surface of said body to be absorbed into said pores but in insufficient volume to saturate said body, applying a second surface of the element in surface to surface contact with said formed surface of said body, pressing the element toward said body to provide for wetting said contacting surfaces and the penetration of said wetting liquid into the minute spaces between said contacting surfaces formed by surface irregularities to develop a capillary force of attraction therebetween distributed over the contacting surfaces retaining the element in stationary position on said body with said specific surface exposed and leaving the element substantially free of internal deforming stresses, and performing a machining operation on said exposed surface of the element.

11. The method of holding a precision article which comprises forming a body of granular porous material, shaping a surface of said body to provide a surface thereon of a high degree of smoothness and accurate to within optical limits of accuracy, applying a quantity of substantially non-setting wetting liquid of low vapor pressure to the surface of said article to be absorbed into said pores, applying the article in surface to surface contact with said formed surface of said body and pressing the article toward said surface to provide for the wetting of said contacting surface and the penetration of said wetting liquid into the minute spaces between said contacting surfaces formed by surface irregularities to develop a capillary force of attraction therebetween distributed over the contacting surfaces and leaving the article substantially free of internal deforming stresses, and applying a surface coating to the exposed surface of said body surrounding the article for maintenance as a distinct separable film on the surface of said body to prevent undesired relative movement between the article and said body.

12. The method of holding a precision article which comprises forming a body of granular porous material, shaping a surface of said body to provide a surface thereon of a high degree of smoothness and accurate to within optical limits of accuracy, applying a quantity of wetting liquid of low vapor pressure to the surface of said article to be absorbed into said pores, applying the article in surface to surface contact with said formed surface of said body and pressing the article toward said surface to provide for the wetting of the contacting surface and the penetration of said wetting liquid into the minute spaces between said contacting surfaces to develop a capillary force of attraction therebetween distributed over the contacting surfaces and leaving the article substantially free of internal deforming stresses, and applying to the exposed surface of said body surrounding said article a surface coating of a wax material adapted to set in place to protect and retain said elements in predetermined relative position, said coating being maintained on the surface of said body and being adapted to be readily stripped therefrom.

13. The method of holding an optical element of optical material for performance of a machining operation on a specific surface thereof which comprises shaping a body of granular porous material to provide thereon a surface of a high degree of smoothness, applying a second surface of the element in surface to surface contact with said shaped surface of said body in the presence of a quantity of wetting liquid of low vapor pressure between said contacting surfaces to provide for the penetration of said wetting liquid into the minute spaces between said contacting surfaces and into the pores of said body to develop a capillary force of attraction therebetween distributed over the contacting surfaces retaining the element in stationary position on said body with said specific surface exposed and leaving the element substantially free of internal deforming stresses, and applying a sealing coating to the junction between the element and the sides of said body adjacent said shaped surface of said body to prevent access of foreign matter to said shaped surface.

14. The method of machining a precision article which comprises forming a body of granular porous non-metallic material, shaping a surface of said body to provide thereon a surface of a high degree of smoothness, applying the article in surface to surface contact with said formed surface of said body in the presence of a quantity of wetting liquid of low vapor pressure between said contacting surfaces to provide for the wetting of said contacting surfaces by said liquid and the penetration of said liquid into the pores of said body to develop a capillary force of attraction therebetween distributed over the contacting surfaces retaining the article in stationary position on said body with a surface thereof exposed and leaving the article substantially free of internal deforming stresses and performing a machining operation on said exposed surface of said article while said article is thus retained on said body.

15. In combination, an optical element and means for holding said element with a specific surface thereof exposed for performance of a machining operation thereon, comprising a substantially rigid body of porous structure having an accurately formed surface thereon, said optical element being mounted with a second surface thereof in direct contact with said formed surface of said body, said body having therein a quantity of substantially non-setting liquid of low vapor pressure primarily retained in said pores below said surface, said liquid being capable of wetting said pores and providing a thin surface film on the contacting surfaces of said element and said body, and said liquid being present in a total quantity insufficient to saturate said pores and thereby developing a strong tractive force retaining said element in stationary position on said body by capillary attraction with said specific surface of said element exposed.

16. In combination, a glass optical element and means for holding said element with a specific surface thereof exposed for performance of a machining operation thereon, comprising a substantially rigid body of porous structure leaving an accurately formed surface thereon and of a lesser degree of hardness than glass, said optical element being mounted with a second surface thereof in direct contact with said formed surface of said body, said body having a quantity of substantially non-setting liquid of low vapor pressure primarily retained in the pores thereof capable of wetting said pores and with a thin surface film thereof present upon said accurately formed surface and in contact with the surface of said element, and said liquid being present in a total quantity insufficient to saturate said pores and thereby developing strong forces of capillary attraction therebetween retaining said element in stationary position on said body with said specific surface of said element exposed.

17. The method of producing an optical element of predetermined optical characteristics through utilization of a substantially rigid plate of porous structure having a quantity of a wetting liquid in the pores thereof capable of developing capillary forces of attraction, which comprises the steps of developing on said porous plate a master surface of predetermined curvature and substantially optical smoothness, mounting said porous plate on a substantially rigid supporting member with said master surface exposed, pressing a thin plate of optical material into contact with said master surface of said porous plate to deform said thin plate into conformance with said master surface and to cause adjacent surfaces of said plates to be held in contact with each other by said forces of capillary attraction, polishing the outer surface of said thin plate while the other surface of said thin plate is held on said porous plate by said forces of capillary attraction until the thickness of said thin plate varies in substantially direct relation with the deviations from optical flatness of said master surface, and then removing said thin plate from said porous plate.

18. The method of producing an optical element of predetermined optical characteristics through utilization of a substantially rigid plate of porous structure having a quantity of a wetting liquid in the pores thereof capable of developing capillary forces of attraction, which comprises the steps of developing on said porous plate a master surface of predetermined curvature and substantially optical smoothness, mounting said porous plate on a substantially rigid supporting member with said master surface exposed, pressing a thin plate of optical material into contact with said master surface of said porous plate to deform said thin plate into conformance with said master surface and to cause adjacent surfaces of said plates to be held in contact with each other by said forces of capillary attraction, polishing the outer surface of said thin plate while the other surface of said thin plate is held on said porous plate by said forces of capillary attraction to substantial flatness, and then removing said thin plate from said porous plate.

19. The method of producing an optical element of predetermined optical characteristics through utilization of a substantially rigid plate of porous structure having a quantity of a wetting liquid in the pores thereof capable of developing capillary forces of attraction, which comprises the steps of developing on said porous plate a master surface of predetermined curvature and substantially optical smoothness, mounting said porous plate on a substantially rigid supporting member with said master surface exposed, pressing a thin plate of optical material into contact with said master surface of said porous plate to deform said thin plate into conformance with said master surface and to cause adjacent surfaces of said plates to be held in contact with each other by said forces of capillary attraction, grinding and polishing the exposed surface of said thin plate to an accurate surface while the other surface of said thin plate is held on said porous plate by said forces of capillary attraction, thereafter removing said thin plate from said porous surface, and mounting the same surface of said thin plate on a substantially rigid support to retain in said plate the configuration imparted thereto by the grinding and polishing while on said holder plate.

20. The method of producing an optical element of predetermined optical characteristics which comprises the steps of forming a substantially plane-parallel plate of substantially rigid porous structure having a quantity of a wetting liquid in the pores thereof capable of developing capillary forces of attraction, transferring said porous plate to a master surface of predetermined curvature on a substantially rigid member and causing said plate to conform with the configuration of said master surface, polishing the outer surface of said porous plate to substantial flatness while the opposite surface of said porous plate remains in contact with said master surface, then transferring said porous plate to a substantially flat surface of a substantially rigid supporting member with said opposite surface of said porous plate exposed, pressing a thin plate of optical material into contact with said exposed surface of said porous plate to deform said thin plate into conformance with said exposed surface of said porous plate and to cause adjacent surfaces of said plates to be held in contact with each other by said forces of capillary attraction, polishing the outer surface of said thin plate to a predetermined configuration while the other surface of said thin plate is held on said porous plate by said forces of capillary attraction, and then removing said thin plate from said porous plate.

21. The method of producing an optical element of predetermined optical characteristics through utilization of a master surface of predetermined curvature on a substantially rigid member, which includes the steps of mounting on said surface a substantially rigid plate of porous structure and substantially uniform thickness having a quantity of a wetting liquid in the pores thereof capable of developing capillary forces of attraction for said master surface, polishing the outer surface of said porous plate to substantial flatness, then transferring said porous plate to a substantially flat surface of a substantially rigid supporting member with said opposite surface of said porous plate exposed, pressing a thin plate of optical material into contact with said exposed surface of said porous plate to deform said thin plate into conformance with said exposed surface of said porous plate and to cause adjacent surfaces of said plates to be held in contact with each other by said forces of capillary attraction, polishing the outer surface of said thin plate to substantial flatness while the other surface of said thin plate is held on said porous plate by said forces of capillary attraction, and then removing said thin plate from said porous plate.

22. A device of the character described for use in the production of an optical element from a thin plate of optical material, comprising a substantially rigid supporting member, a substantially rigid plate of porous structure mounted on said supporting member with a surface thereof exposed, said exposed surface having at least a portion thereof curved in three dimensions about at least one finite radius and being substantially optically smooth, and said porous plate having a quantity of a substantially non-setting wetting liquid of low vapor pressure in the pores thereof capable under pressure of developing capillary forces of attraction for said supporting member and for said thin plate of optical material to cause said thin plate to deform into substantial conformance with the configuration of said curved surface and to hold said thin plate in substantially uniform contact with said curved surface with the surface thereof opposite said curved surface exposed for performance of a machining operation thereon.

23. A device of the character described for use in the production of optical elements comprising a substantially rigid supporting member, a substantially rigid plate of porous structure mounted on said supporting member with a surface thereof exposed, said exposed surface being of predetermined curvature and being substantially optically smooth, and a thin plate of optical material superimposed on said curved surface of said porous plate and deformed into substantially uniform contact with said curved surface, said porous plate having a quantity of a substantially non-setting wetting liquid of low vapor pressure in the pores thereof developing capillary forces of attraction for said supporting member and said thin plate to retain the adjacent surface of said thin plate in said substantially uniform contact with said curved surface of said porous plate.

24. A device of the character described for use in the production of optical elements comprising a substantially rigid supporting member having a substantially optically flat surface, a substantially rigid plate of porous structure having a substantially optically flat surface mounted on said supporting member with said flat surfaces of said member and said plate in contact, the surface of said porous plate opposite said flat surface thereof being of predetermined curvature and being substantially optically smooth, and a thin plate of optical material superimposed on said curved surface of said porous plate and deformed into substantially uniform contact with said curved surface to cause the inner surface of said thin plate to conform with said curved surface of said porous plate, said porous plate having a quantity of a substantially non-setting wetting liquid of low vapor pressure in the pores thereof developing capillary forces of attraction for said supporting member and said thin plate to retain said plates on said supporting member, and the outer surface of said thin plate being substantially optically flat and substantially parallel with said flat surface of said supporting member.

25. The method of producing an optical element of uniform thickness from a deformable plate of optical material having non-flat surfaces through utilization of a substantially rigid body of porous structure having an optically flat surface and having a quantity of wetting liquid in the pores thereof capable of developing capillary forces of attraction, which comprises the steps of mounting said plate on said optically flat surface of said body with one surface thereof exposed, pressing said plate against said body to deform said plate into conformance with said smooth surface and to cause the adjacent surfaces of said plate and said body to be held in uniform contact with each other by said forces of capillary attraction, and grinding and polishing said exposed surface of said plate until said exposed surface is optically flat while the opposite surface of said plate is held on said body by said forces of capillary attraction.

References Cited in the file of this patent

UNITED STATES PATENTS

| Number | Name | Date |
|---|---|---|
| 351,355 | Bigelow | Oct. 26, 1886 |
| 536,760 | Ratcliff | Apr. 2, 1895 |
| 1,199,108 | Peiler | Sept. 26, 1916 |
| 1,589,787 | Butler | June 22, 1926 |
| 1,930,277 | Lenz | Oct. 10, 1933 |
| 2,086,787 | Whiteley | July 13, 1937 |
| 2,093,800 | May | Sept. 21, 1937 |
| 2,228,406 | Schmidt | Jan. 14, 1941 |
| 2,241,415 | Moulton | May 13, 1941 |
| 2,310,925 | Bardwell et al. | Feb. 16, 1943 |
| 2,319,616 | Luehrs | May 18, 1943 |
| 2,392,998 | Pross | Jan. 15, 1946 |
| 2,404,808 | Lewey | July 30, 1946 |
| 2,420,606 | McLeod et al. | May 13, 1947 |
| 2,431,041 | Hassler | Nov. 18, 1947 |
| 2,482,698 | Tillyer | Sept. 20, 1949 |

OTHER REFERENCES

Sweets Catalog 1942, Item 11–70–1 Folio of Bird & Sons, Inc., Catalog #32A–3.